(12) United States Patent
Hankinson

(10) Patent No.: US 7,347,197 B2
(45) Date of Patent: Mar. 25, 2008

(54) FOOD ROASTING APPARATUS

(76) Inventor: Dan L. Hankinson, 457 E. Britton Rd., Morrice, MI (US) 48857

( * ) Notice: Subject to any disclaimer, the term of this patent is extended or adjusted under 35 U.S.C. 154(b) by 0 days.

(21) Appl. No.: 11/612,227

(22) Filed: Dec. 18, 2006

(65) Prior Publication Data

US 2007/0084353 A1   Apr. 19, 2007

Related U.S. Application Data

(63) Continuation-in-part of application No. 10/823,074, filed on Apr. 13, 2004, now abandoned.

(51) Int. Cl.
*F24B 3/00* (2006.01)
*A47J 37/04* (2006.01)

(52) U.S. Cl. .................... 126/30; 126/25 A; 99/427; 99/441

(58) Field of Classification Search ............... 126/30, 126/29, 25 R, 25 A, 25 AA; 99/441, 426, 99/427, 419
See application file for complete search history.

(56) References Cited

U.S. PATENT DOCUMENTS 2,642,796 A * 6/1953 La Bore ..................... 99/441
2,935,982 A * 5/1960 Otis ........................... 126/30
2,977,953 A * 4/1961 Miller ......................... 126/30
3,433,151 A * 3/1969 Frederick et al. ............ 99/441
4,380,192 A * 4/1983 Doren ......................... 99/441
5,307,797 A * 5/1994 Kleefeld ..................... 126/30
5,310,381 A * 5/1994 Green ....................... 452/198
5,628,244 A * 5/1997 Holliday ................. 99/421 A
5,666,940 A * 9/1997 Kreiter ....................... 126/30

FOREIGN PATENT DOCUMENTS

CH            420 534 A   *   3/1967

* cited by examiner

*Primary Examiner*—Josiah C. Cocks
(74) *Attorney, Agent, or Firm*—Dale J. Ream

(57) ABSTRACT

A food roasting apparatus according to the present invention includes an elongate rigid rod with opposite first and second ends, a handle attached to the first end, and a basket attached to the second end. The rod defines a rod longitudinal axis, the basket defines a basket longitudinal axis, and the rod includes an offset portion such that the rod longitudinal axis is inline with the basket longitudinal axis. Since the rod longitudinal axis is inline with the basket longitudinal axis, the basket does not rise or fall when rotated with the rod. The food roasting apparatus may include a sleeve coupled to the rod and a stand that releasably captures the sleeve and supports the rod. The present invention includes an open-ended basket and a basket that easily and safely opens and closes. When cool, the basket can be removed from the rod for transport or cleaning.

3 Claims, 9 Drawing Sheets

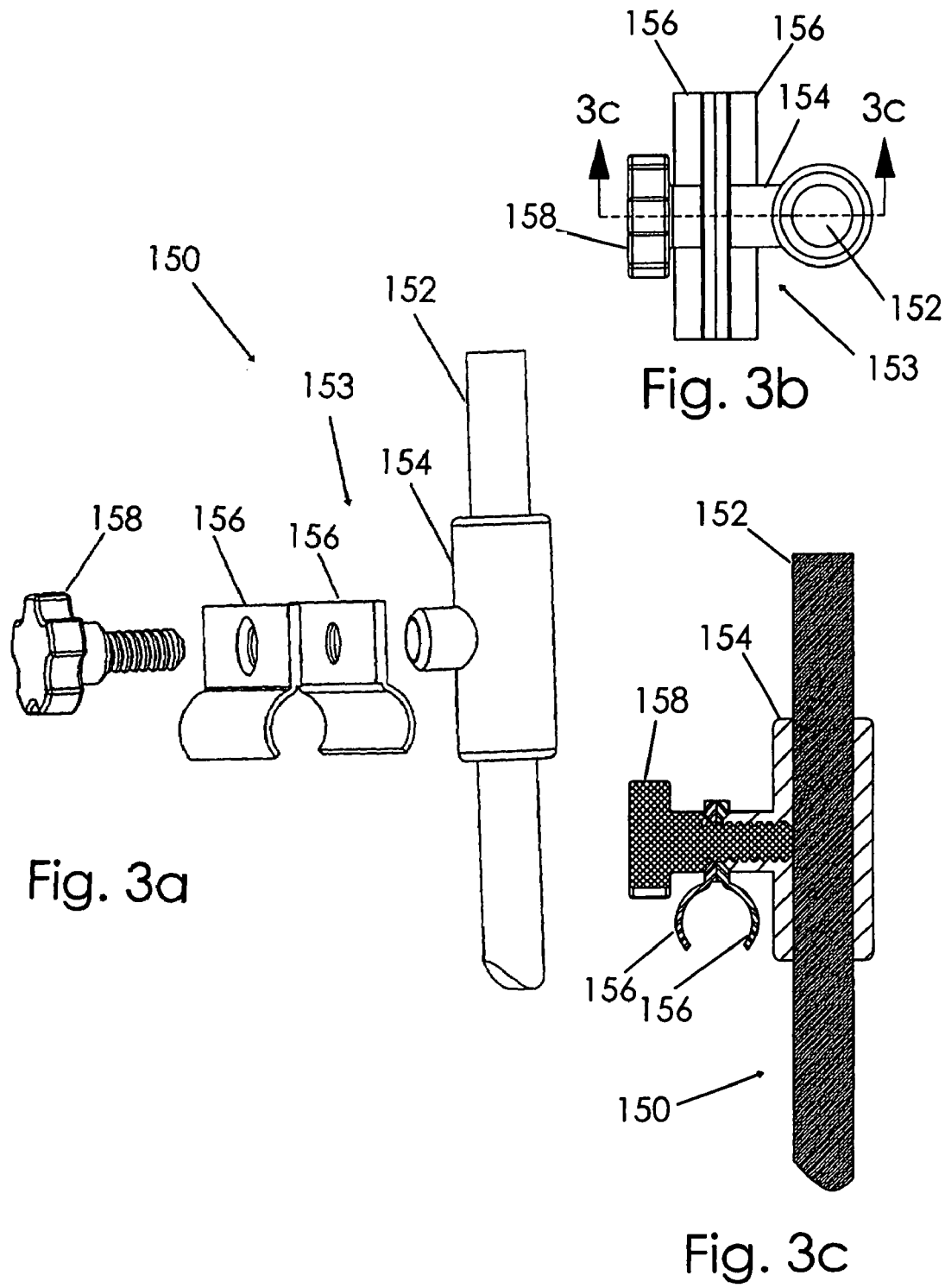

FOOD ROASTING APPARATUS

CROSS REFERENCE TO RELATED APPLICATION

The present application is a continuation in part of U.S. patent application Ser. No. 10/823,074, filed 13 Apr. 2004 now abandoned and titled "FOOD ROASTING APPARATUS", which is incorporated herein by reference.

BACKGROUND OF THE INVENTION

This invention relates generally to roasting devices and, more particularly, to a food roasting apparatus that holds food items when cooking on an open fire or grill.

Many people have long enjoyed cooking over open fires. Though people have traditionally cooked over an open fire with a twig or stick, campers and picnickers have long been seeking an easier, cleaner, and better way. In response, several products have been made available for cooking traditional campfire foods such as hot dogs, sausages, and marshmallows. Many of these products employ a skewer-type utensil to hold the food, such as in U.S. Pat. Nos. 5,117,558, 6,085,642, and 6,196,121, which require the food item to be punctured. The puncturing of the food can easily cause the food to split apart or lose most of its moisture during cooking. These products also raise safety concerns since the sharp points on the utensils' tips can be especially dangerous for children and can cause accidents when being carried or transported.

Other products have used wire baskets to hold the food, but these products have had their own disadvantages. Those with baskets that open and close, such as U.S. Pat. Nos. 3,433,151 and 5,307,797, have been cumbersome to operate, which can easily lead to the operator being burned or dropping the food. Those with open baskets, such as in U.S. Pat. Nos. 2,804,819, 4,380,192, 5,355,778, and 5,628,244, are unbalanced or open on the end furthest from the user. In the unbalanced products, the basket and food item are being raised and lowered a small amount as the handle is rotated. This requires extra work to be done by the user, and it may also affect how well the food is cooked by changing the distance between the food and the fire. Thus, user fatigue and uneven cooking result. If the end furthest from the user is open, the food will fall if the user does not keep the device level or angled upwards, and it is somewhat difficult to unload the food to the desired location. If a user becomes fatigued, the end furthest from the user will often become angled downward.

Finally, some of the available products do not allow the food to cook evenly by rotating laterally, such as U.S. Pat. No. 5,775,207, and many of those mentioned above cannot be disassembled for cleaning or carrying.

Therefore, it is desirable to have a food roasting apparatus that does not puncture food, allows food to cook evenly, is easy to use, easy and safe to carry, and easy to clean.

SUMMARY OF THE INVENTION

A food roasting apparatus according to the present invention includes an elongate rigid rod with a first end and a second end opposite the first end, a handle attached to the first end of the rod, and a basket attached to the second end of the rod. The rod defines a rod longitudinal axis, the basket defines a basket longitudinal axis, and the rod includes an offset portion at the second end such that the rod longitudinal axis is inline with the basket longitudinal axis during rotation of the rod about the rod longitudinal axis. The food roasting apparatus may also include a sleeve coupled to the rod and a stand that releasably captures the sleeve and supports the rod. The present invention includes an open-ended basket and a basket that easily opens and closes at the user's discretion.

In use, food is positioned inside the food roasting apparatus' wire basket. The basket is then placed over a heat source such as an open fire or grill. The user can either hold the food roasting apparatus or the stand can be used to support the rod. When the food needs to be rotated, the user rotates the rod about the rod longitudinal axis, causing the basket to rotate about the basket longitudinal axis. Since the rod longitudinal axis is inline with the basket longitudinal axis, the basket does not rise or fall when rotated. If an open-ended basket is used, the end closest to the handle is open. After the food is cooked and removed from the heat source, the user tilts the basket up, causing the food to slide out to a predetermined location. If an opening and closing basket is used, a trigger is located near the handle. After the food is cooked and removed from the heat source, the user engages the trigger, causing the basket to open and the food to fall to a predetermined location. After the food roasting apparatus cools, the basket can be removed from the rod for transport or cleaning. The basket will preferably fit in a standard dishwasher and be dishwasher-safe, though it may also be cleaned by hand.

Therefore, a general object of this invention is to provide a food roasting apparatus that does not puncture food.

Another object of this invention is to provide a food roasting apparatus, as aforesaid, that allows food to cook evenly.

Still another object of this invention is to provide a food roasting apparatus, as aforesaid, that is easy to use and does not unduly fatigue the user.

Yet another object of this invention is to provide a food roasting apparatus, as aforesaid, that is easy and safe to carry.

A further object of this invention is to provide a food roasting apparatus, as aforesaid, that is easy to clean.

A still further object of this invention is to provide a food roasting apparatus, as aforesaid, that that can be easily manufactured.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1b is a top view of the food roasting apparatus as in FIG. 1a;

FIG. 3a is an exploded view of the clamp;

FIG. 3b is an assembled side view of the clamp as in FIG. 3a;

FIG. 3c is a sectional view taken along line 3c-3c of FIG. 3b;

FIG. 5e is an isolated sectional view on an enlarged scale of a trigger assembly as in FIG. 5a;

FIG. 7 is a partial exploded view of the food roasting apparatus as in FIG. 5a;

FIG. 8c is a side perspective view of the food roasting apparatus as in FIG. 8a;

FIG. 9a is a perspective view of the food roasting apparatus as in FIG. 5a in use with a modified sleeve and with the stand and clamp as in FIG. 3a; and FIG. 9b is a perspective view on an enlarged scale of the sleeve as in FIG. 9a.

DESCRIPTION OF THE PREFERRED EMBODIMENT

Figure 1A:
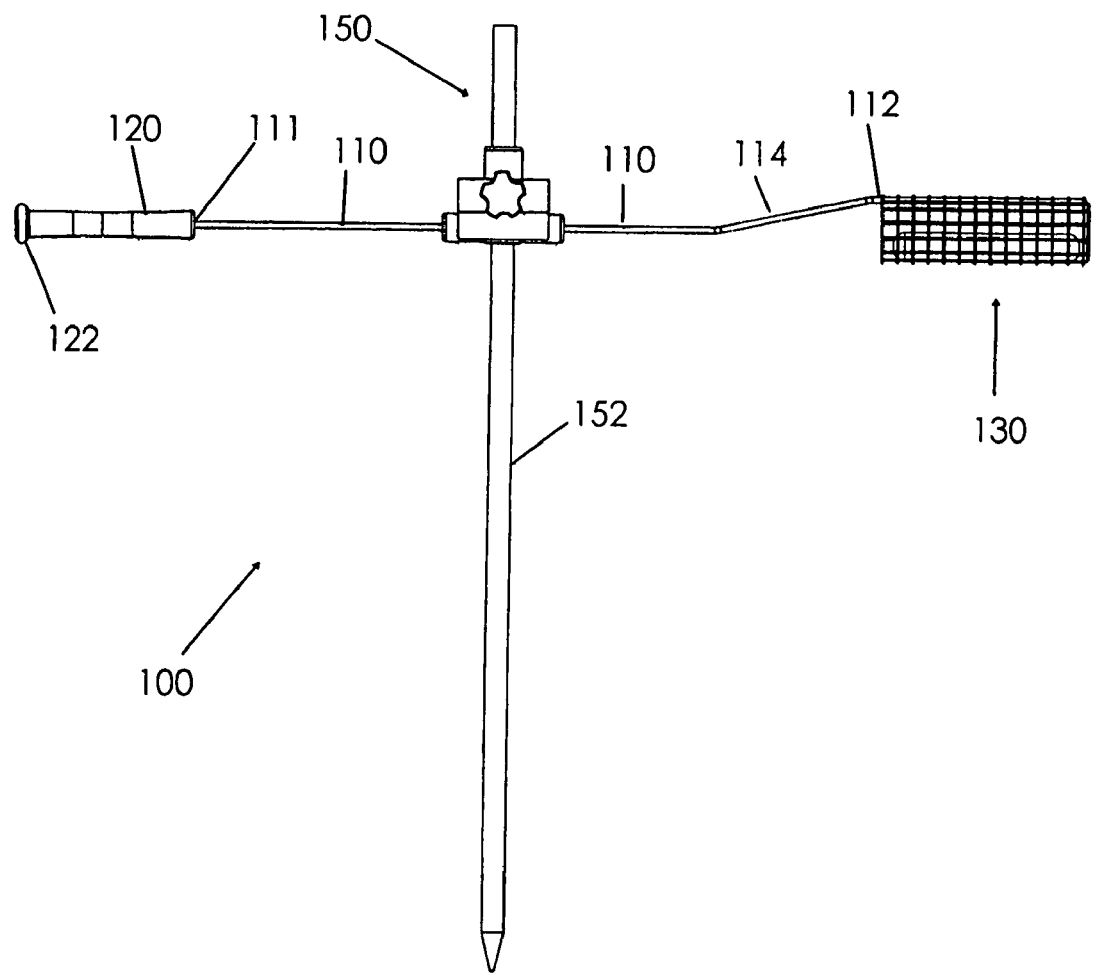
FIG. 1a is a front view of a food roasting apparatus according to a now preferred embodiment of the present invention.
Figure 1B:
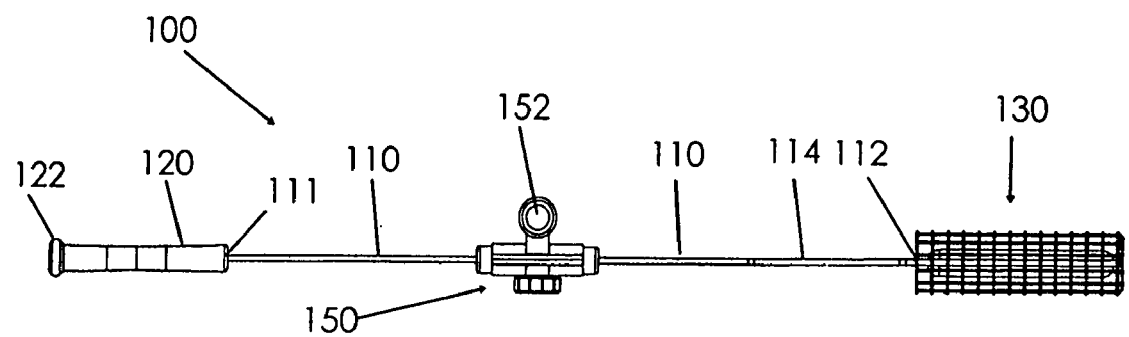

A food roasting apparatus according to one embodiment of the present invention will now be described in detail with reference to FIGS. 1a through 4b of the accompanying drawings. More particularly, a food roasting apparatus 100 according to a now preferred embodiment includes an elongate rigid rod 110 with a first end 111 and a second end 112 opposite the first end 111. A handle 120 is attached to the first end 111 of the rod 110, and a basket 130 is removably attached to the second end 112 of the rod 110. The handle 120 preferably includes an enlarged, round knob 122 to facilitate rotation and is preferably constructed of a material that is slow to conduct heat.

Figure 2A:
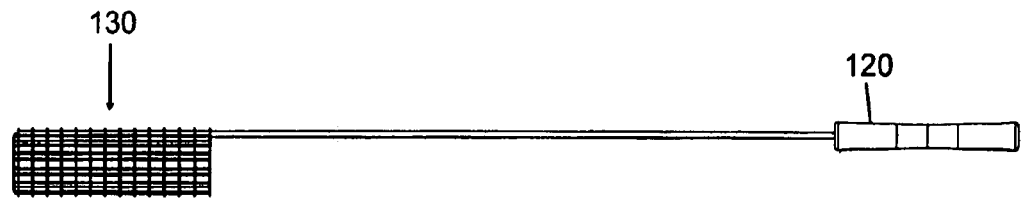
FIG. 2a is a side view of a food roasting apparatus with a straight rod.
Figure 2B:
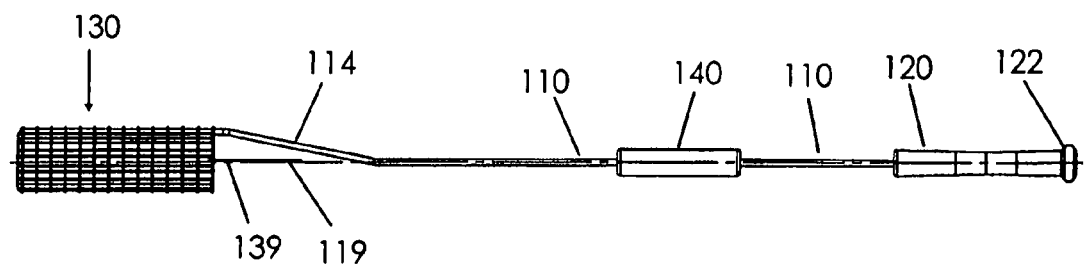
FIG. 2b is a side view of the food roasting apparatus as in FIG. 1a without the stand.
Figure 2C:
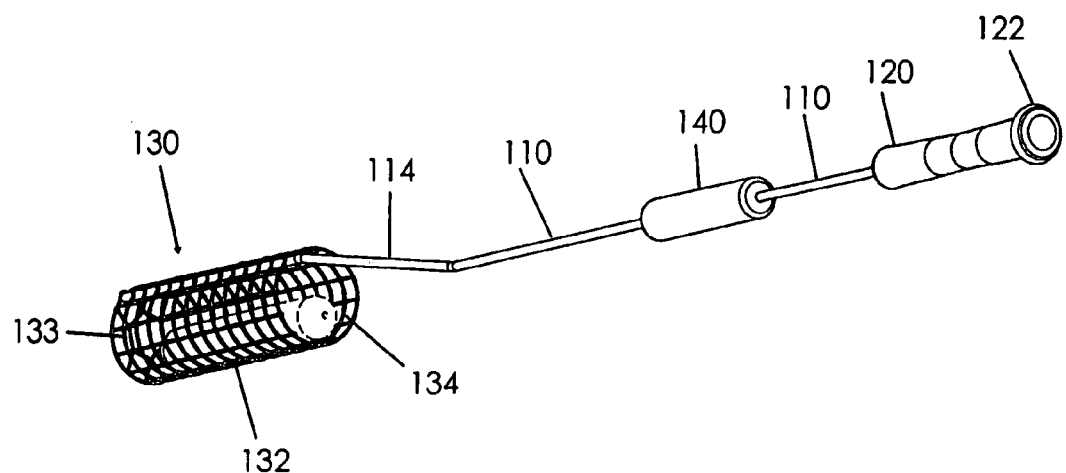
FIG. 2c is a side perspective view of the food roasting apparatus as in FIG. 1a with a food item in the basket but without the stand.

The rod 110 defines a rod longitudinal axis 119, and the basket 130 defines a basket longitudinal axis 139. The rod 110 includes an offset portion 114 at the second end 112 such that the rod longitudinal axis 119 is inline with the basket longitudinal axis 139 during rotation of the rod 110 about the rod longitudinal axis 119 (FIG. 2b). This keeps the basket 130 from being raised and lowered as the rod 110 is rotated, as would happen without the offset portion 114 (FIG. 2a). Since the basket 130 is not being raised and lowered, less work is required from the user and the food is held at a constant distance from the heat source.

Figure 4A:
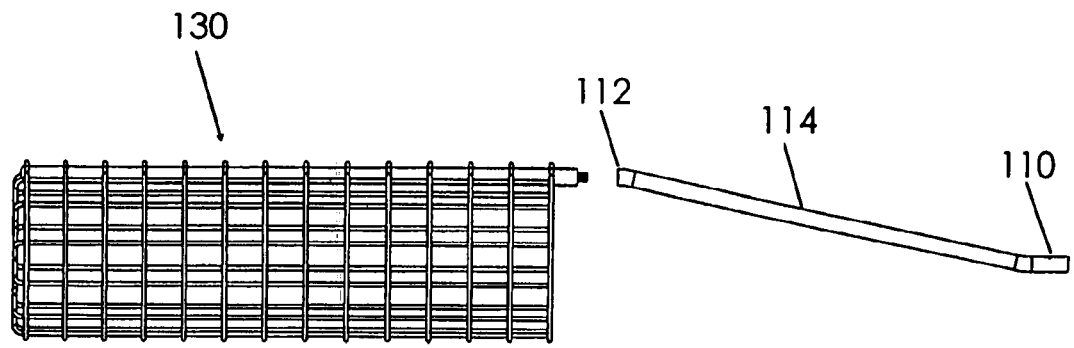
FIG. 4a is an exploded view of a basket and rod.

The basket 130 is of wire-frame construction and preferably includes a tubular configuration having a continuous side wall 132. Relative to the handle 120, the distal end 133 is closed and the proximal end 134 is open. The basket 130 is preferably constructed of stainless steel or a similar material that will not corrode and is easy to clean, and connections are preferably welded together to provide permanent connections that can withstand high heat and repeated use. The basket 130 is removably attached to the rod 110 to aid in cleaning and carrying the food roasting apparatus 100 (FIG. 4a). In FIG. 4a, the basket 130 is shown as a threaded attachment, but other methods of connecting the basket 130 to the rod 110 would also be suitable.

Figure 4B:
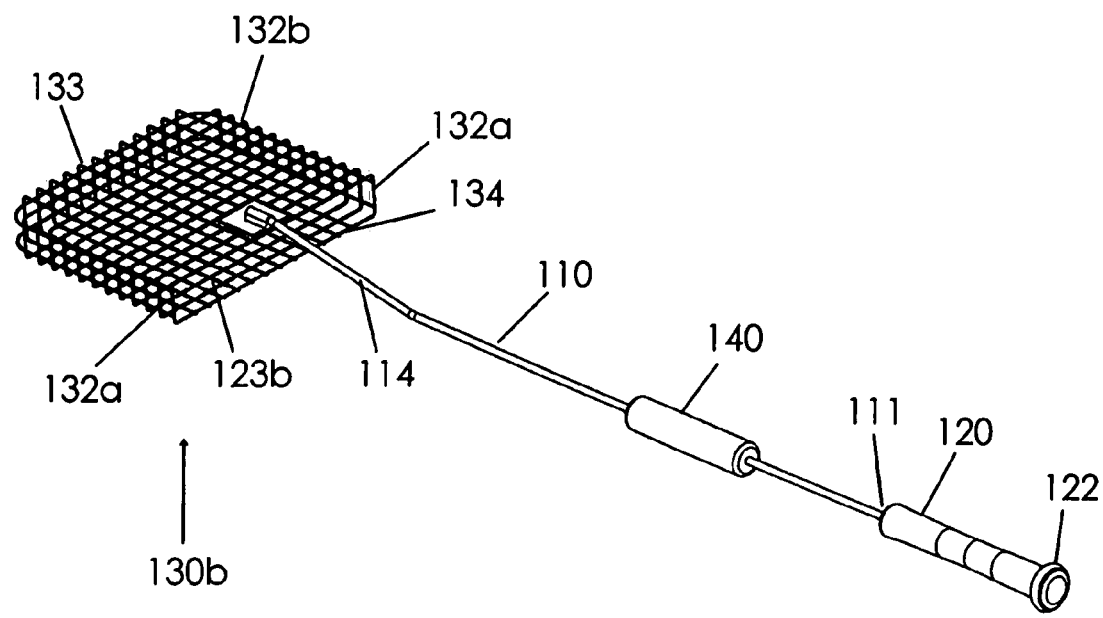
FIG. 4b is a side perspective view of a food roasting apparatus according to another embodiment of the invention with a flat basket attachment but without a stand.

Instead of the tubular configuration shown throughout most of the drawings, the basket 130 may have a flat configuration 130b as seen in FIG. 4b. This flat configuration 130b may be more suitable for cooking some types of food, such as fish and hamburgers. The flat configuration 130b has two opposed short side walls 132a and two opposed long side walls 132b. Relative to the handle 120, the distal end 133 is closed and the proximal end 134 is open. The rod longitudinal axis 119 is still inline with the basket longitudinal axis 139 during rotation of the rod 110 about the rod longitudinal axis 119.

A sleeve 140 is coupled to the rod 110 and slides and rotates therealong. This allows the user to hold the sleeve 140 with one hand while rotating the handle 120 with the other hand. Alternately, the sleeve 140 may be attached to a stand 150 (FIG. 1a) to provide a hands-free way of holding the food roasting apparatus 100 over the fire. The sleeve 140 is preferably constructed of a material that is slow to conduct heat. The stand 150 includes a stake 152 that can be firmly planted in the ground and a clamp 153 composed of a slider 154, two clamp plates 156, and a bolt 158 (FIG. 3a).

In use, food is placed in basket 130 through open proximal end 134. The basket 130 is then placed over a heat source such as an open fire or grill. The user can hold the handle 120 and the sleeve 140, or the stand 150 can be used to support the rod 110. If the stand 150 is used, the stake 152 is planted firmly in the ground near the heat source. The slider 154 is coupled to the stake 152, and the slider 154 can slide and rotate therealong. The sleeve 140 is placed between the clamp plates 156, and the bolt 158 passes through the clamp plates 156 and threads into the slider 154. The bolt is then tightened against the stake 152, holding the sleeve 140 in place (FIGS. 3a through 3c). When the food needs to be rotated, the user turns the handle 120, which rotates the rod 110 about the rod longitudinal axis 119 and causes the basket 130 to rotate about the basket longitudinal axis 139. Since the rod longitudinal axis 119 is inline with the basket longitudinal axis 139, the basket 130 does not rise or fall when rotated; this results in minimal effort being required and the food cooking evenly. After the food is cooked and removed from the heat source, the user tilts the basket 130 upwards, causing the food to slide out through open proximal end 134 to a predetermined location. After the food roasting apparatus 100 cools, the basket 130 can be removed from the rod 110 for transport or cleaning. The basket will preferably fit in a standard dishwasher and be dishwasher-safe, though it may also be cleaned by hand.

A food roasting apparatus 200 according to another embodiment of the present invention is shown in FIGS. 5a through 7 and includes a construction substantially similar to the construction previously described except as specifically noted below. More particularly, the food roasting apparatus 200 according to this embodiment includes a basket 230 made of two halves 232 that are removably hinged on the rod 110. The two basket halves may also be referred to as first and second basket members. A nut 234 attaches to the end of rod 110 to hold the basket halves 232 in place. A mechanical linkage connected to a trigger 270 spreads the basket halves 232 apart, allowing the user to release or pick up food without handling it directly.

Figure 5A:
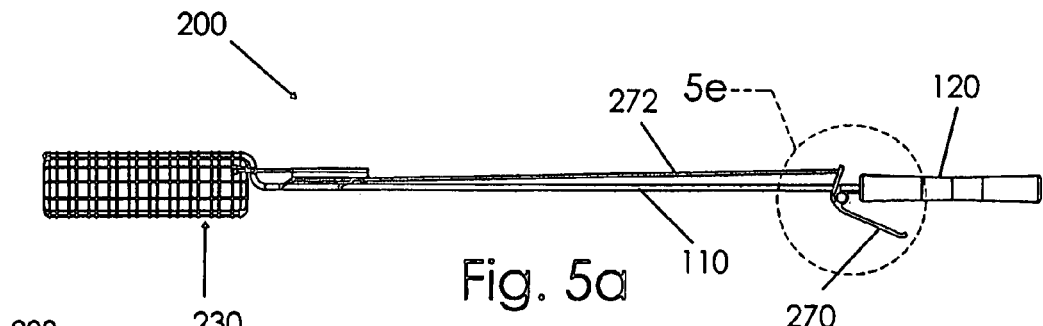
FIG. 5a is a side view of a food roasting apparatus according to another embodiment with a basket that opens and closes by operating a trigger.
Figure 5B:
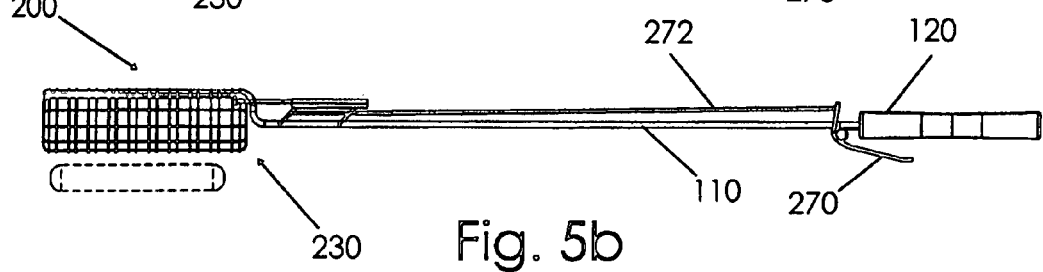
FIG. 5b is a side view of the food roasting apparatus as in FIG. 5a with the basket in an open configuration situated over a food item.
Figure 5C:
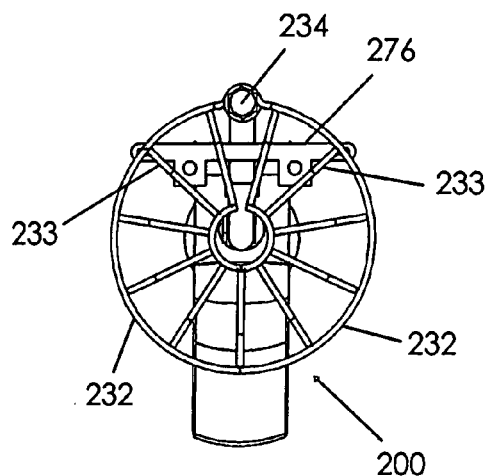
FIG. 5c is a front view of the food roasting apparatus as in FIG. 5a with the basket in a closed configuration.
Figure 5D:
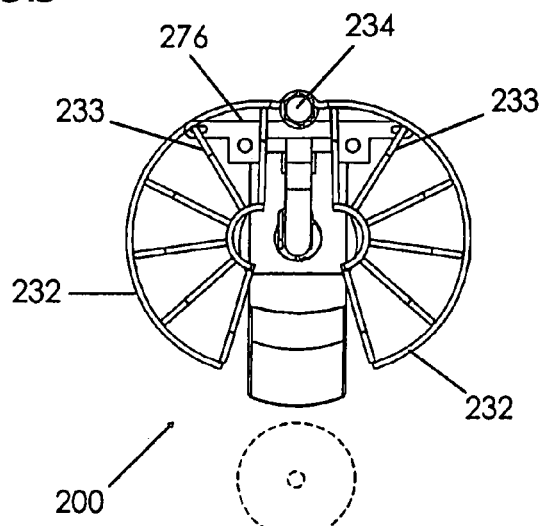
FIG. 5d is a front view of the food roasting apparatus as in FIG. 5a with the basket in an open configuration situated over a food item.
Figure 5E:
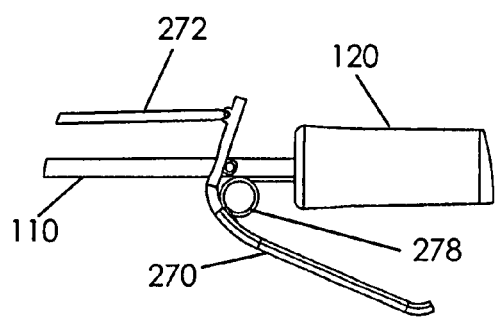
Figure 6A:
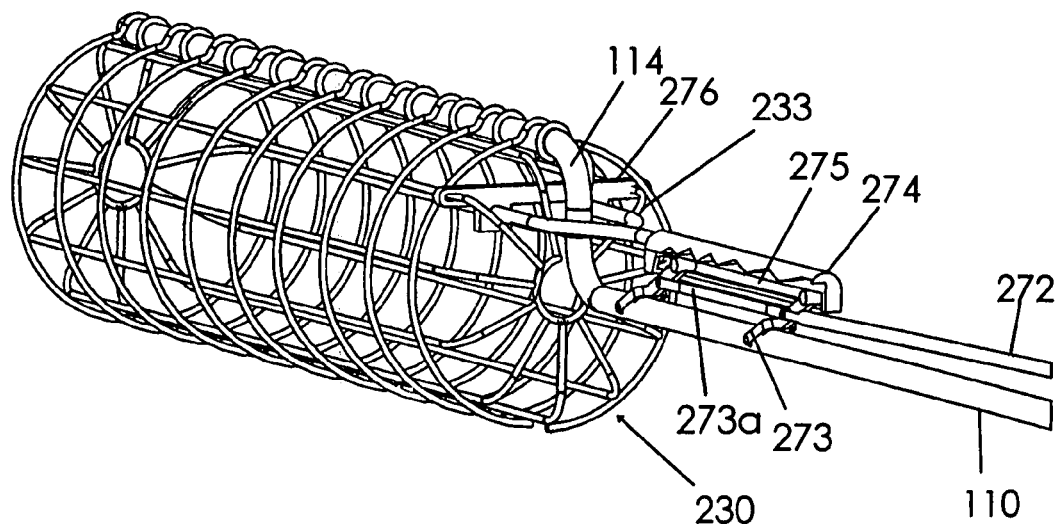
FIG. 6a is a partial side perspective view of the food roasting apparatus as in FIG. 5a with the basket in a closed configuration.
Figure 6B:
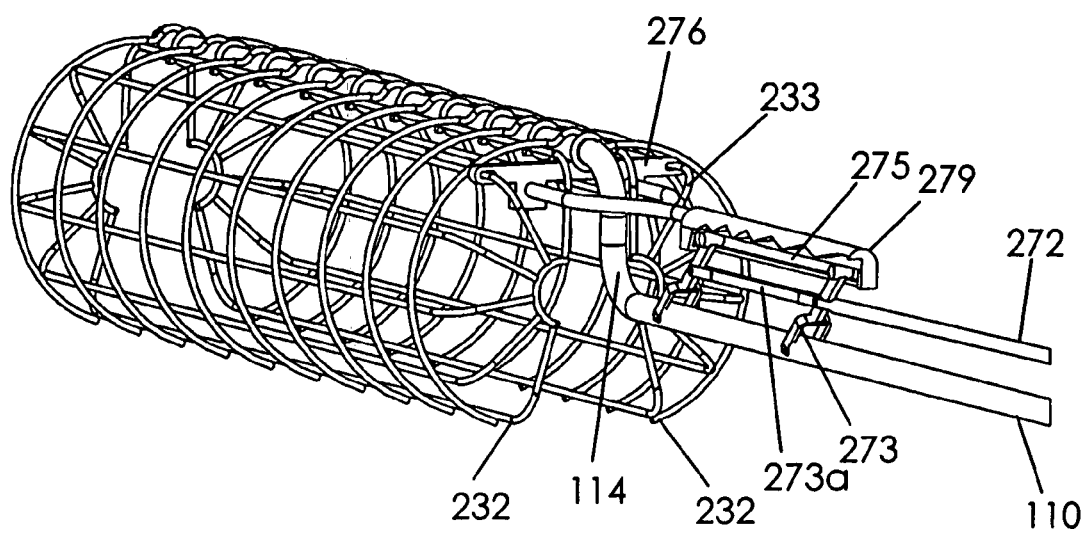
FIG. 6b is a partial side perspective view of the food roasting apparatus as in FIG. 5a with the basket in an open configuration.
Figure 7:
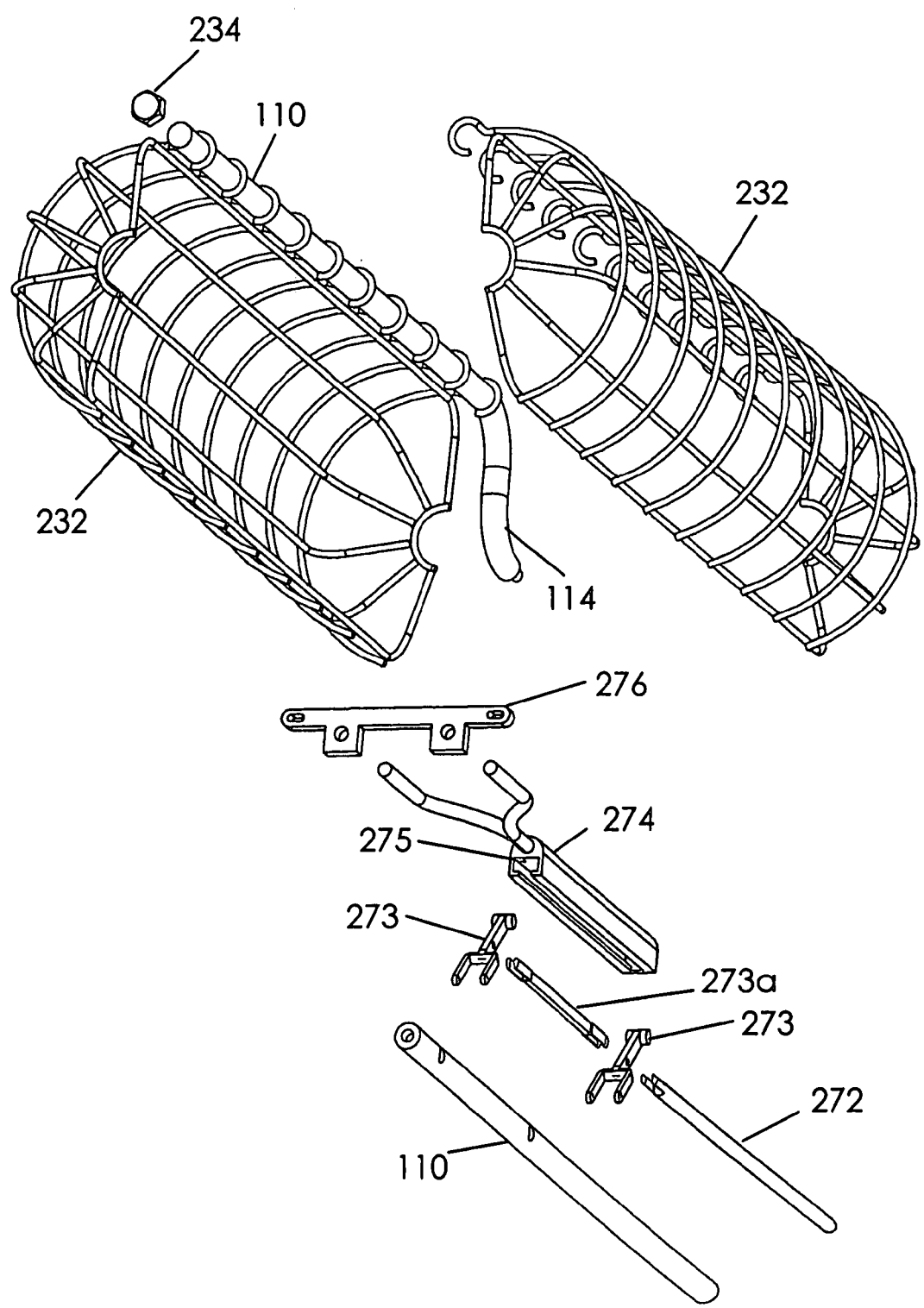

More particularly, squeezing the trigger 270 moves a pushrod 272 forward, rotating arms 273 with the aid of an arm-linkage 273a (FIG. 6b). The arms 273 slide in a track 275 of a fork 274 when rotated, which translates their rotation into upward movement of the fork 274. The fork 274 is engaged with a link 276 that is connected to a wire 233 on each basket half 232. When the fork 274 moves upward, the link 276 raises the wires 233, causing the basket halves 230 to spread apart (FIGS. 5b, 5d, 6b). A spring 278 operatively coupled to the trigger 270 and linkage returns all parts to the closed position when the trigger 270 is released (FIGS. 5a, 5c, 6a). The track 275 is open at the end nearest the basket 230, allowing the user to slide the fork 274 back and remove the basket 230 from the rod 110.

Figure 9A:
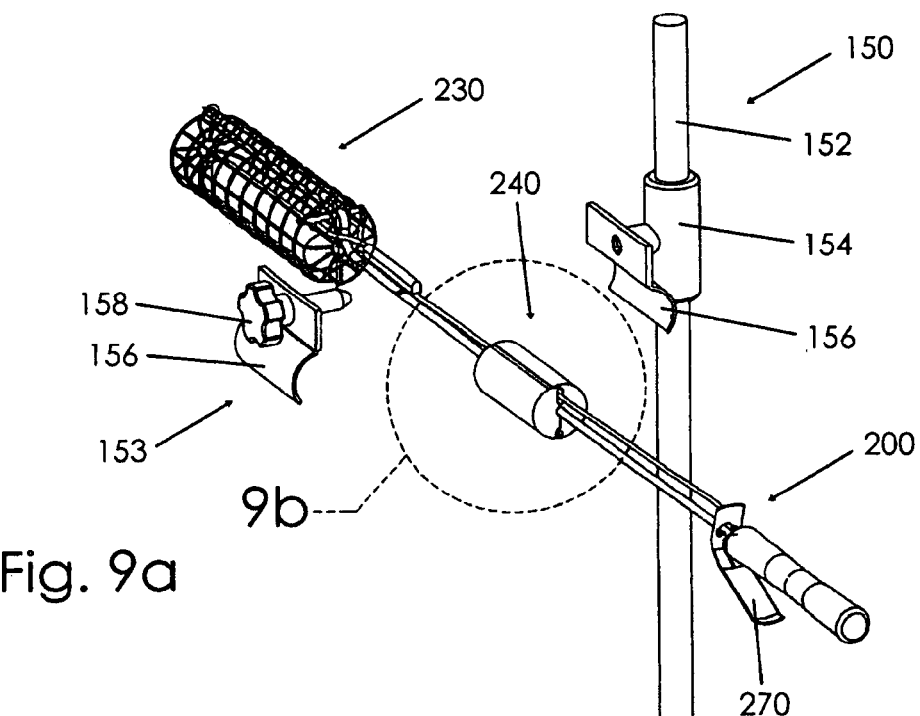
Figure 9B:
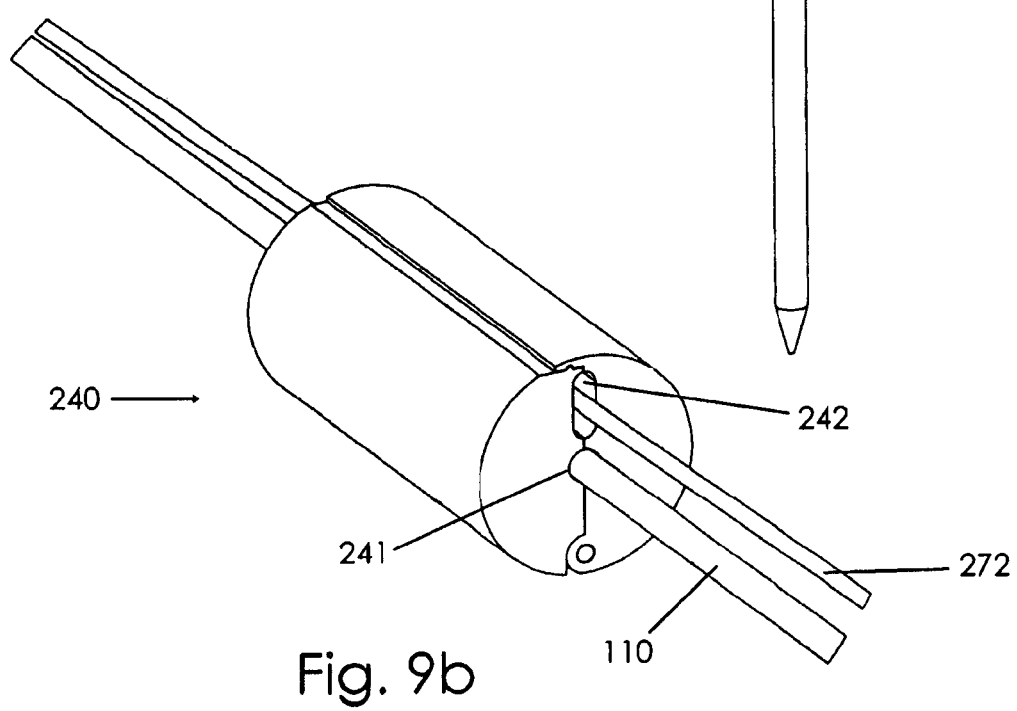

It should be appreciated that the food roasting apparatus 200 according to this embodiment is also able to be used in cooperation with a modified sleeve 240 and with the stand 150 and clamp 153 (FIGS. 9a and 9b). More particularly, the sleeve 240 functions in a manner substantially similar to the sleeve 140 described previously; namely, it is coupled to the rod 110 and may slide therealong. This enables the user to hold the sleeve 240 with one hand while operating the trigger 270 with the other hand. By contrast to the first described embodiment, however, a user is not able to completely rotate the rod 110 while the sleeve 240 is attached. As best seen in FIG. 9b, the modified sleeve 240 defines an axial bore 241 as well as a secondary bore 242 adjacent parallel to the axial bore 241. The sleeve 240 includes a hinged construction having a pair of hemispherical sections, each being a substantially mirror image of the other. In use, the sleeve 240 may be moved to an open configuration and the rod 110 may be received in the axial bore 241 such that the sleeve 240 may be slidable along the rod 110 when the sleeve 240 is moved back to the closed configuration. Further, when the sleeve 240 is at the open configuration, the push rod 272 may be received in the secondary bore 242, also enabling the sleeve 240 to move slidably along the pushrod 272 when the sleeve is moved back to the closed configuration. The sleeve 240 may then be selectively moved along the rod 110 and push rod 272 as desired. The sleeve may then be placed between the clamp plates 156 and secured with the bolt as described above. As the sleeve envelops the push rod 272, there is no interference between the sleeve 240 and the clamp 153.

Figure 8A:
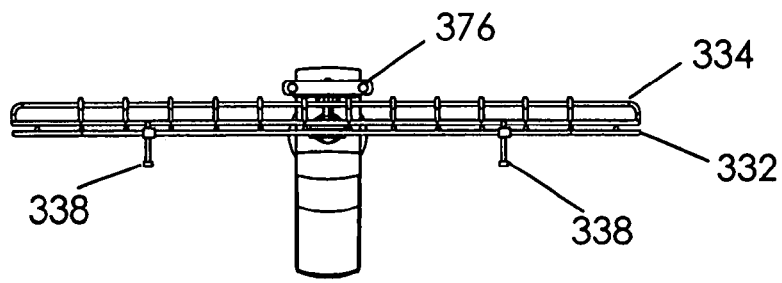
FIG. 8a is a front view of a food roasting apparatus according to yet another embodiment of the present invention with a flat basket that opens and closes by operating a trigger in a closed configuration.
Figure 8B:
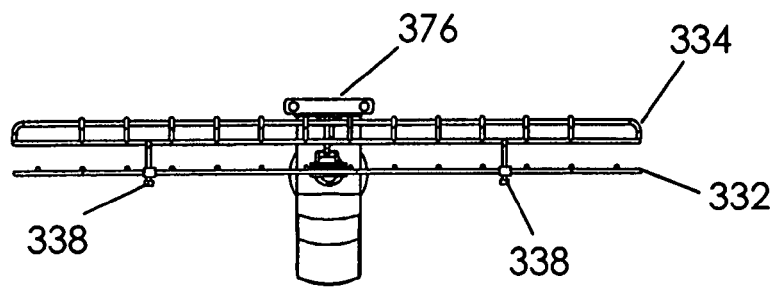
FIG. 8b is a front view of the food roasting apparatus as in FIG. 8a with the basket in an open configuration.
Figure 8C:
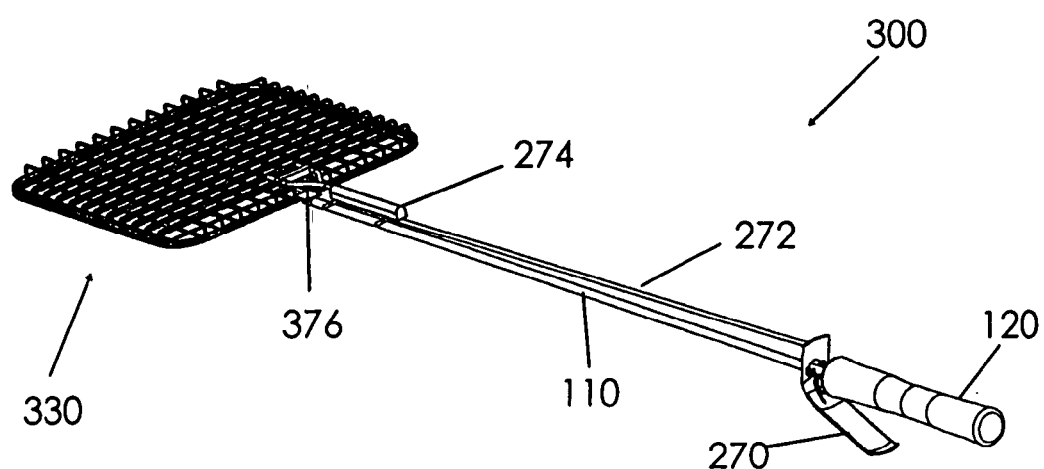

A food roasting apparatus 300 according to still another embodiment of the present invention is shown in FIGS. 8a through 8c and includes a construction substantially similar to the construction previously described except as specifically noted below. More particularly, the food roasting apparatus 300 according to this embodiment includes a basket 330 with an opening and closing generally flat configuration. The rod 110 attaches to a bottom surface 332, and the fork 274 attaches to a link 376 on a basket top 334. When the fork 274 moves upward, the link 376 and basket top 334 are raised and separated from the bottom surface 332, allowing food to be inserted or removed. The basket top 334 and the bottom 332 surfaces are slidably connected for operation between open (FIG. 8b) and closed (FIG. 8a) configurations, and releasable stops 338 restrict how far the basket top 334 can be raised in order to keep the arms 273 in the track 275 (FIG. 7) during operation.

It is understood that while certain forms of this invention have been illustrated and described, it is not limited thereto except insofar as such limitations are included in the following claims and allowable functional equivalents thereof.

What is claimed is:

1. A food roasting apparatus, comprising:
an elongate rigid rod having a first end and a second end opposite said first end, said rod defining a rod longitudinal axis;
a handle attached to said first end of said rod, said handle being constructed of a material that is slow to conduct heat;
a basket removably attached to said second end of said rod and defining a basket longitudinal axis, said basket having a wire-frame construction;
wherein said rod includes an offset portion at said second end connecting said rod to said side wall of said basket such that said rod longitudinal axis is inline with said basket longitudinal axis during rotation of said rod about said rod longitudinal axis;
a sleeve coupled to said rod for slidable movement therealong, said sleeve including a pair of hemispherical sections hingedly coupled to one another for selective movement between open and closed configurations;
wherein said sleeve defines an axial bore for receiving said rod when said hemispherical sections are at said open configuration such that said sleeve is slidably movable along said rod;
wherein said sleeve defines a secondary bore parallel to said axial bore;
a stake having a pointed end for ground penetration;
a clamp coupled to said stake for slidable vertical movement therealong, said clamp having means for releasably capturing said sleeve, whereby said rod is slidably movable relative to said sleeve to a desired horizontal position;
wherein said basket includes:
a first basket member and a second basket member hingedly coupled to said first basket member;
a trigger coupled to said rod adjacent said handle;
a linkage operatively connecting said trigger with said first and second basket members for selectively moving said first and second basket members between open and closed configurations;
wherein said linkage includes:
a pushrod connected to said trigger such that operation of said trigger moves said pushrod between a first position and a second position, said pushrod being received in said sleeve secondary bore when said hemispherical sections are at said open configuration such that said sleeve is slidably movable along said pushrod;
a rotating arm connected to said pushrod and pivotally connected to said rod, such that movement of said pushrod causes said rotating arm to rotate;
a fork with a track coupled to said rotating arm such that said rotating arm slides in said track, a rotation of said rotating arm causing said fork to move perpendicular to said rod longitudinal axis;
a link connected to said first and second basket members and releasably connected to said fork, such that movement of said fork away from said rod longitudinal axis causes said link to move away from said rod longitudinal axis and separate said first and second basket members; and a spring connected to said trigger for normally biasing said pushrod toward said first position when said trigger is not being operated by a user.

2. The food roasting device as in claim 1 wherein said stake defines a vertical axis when positioned in the ground and said clamp selectively rotates about said vertical axis defined by said stake.

3. Te food roasting device as in claim 1 wherein said sleeve is constructed of a material that is slow to conduct heat.

\* \* \* \* \*